United States Patent [19]

Feild, Jr.

[11] 4,189,398

[45] Feb. 19, 1980

[54] NUCLEAR FUEL COMPOSITION

[75] Inventor: Alexander L. Feild, Jr., Pittsburgh, Pa.

[73] Assignee: The United States of America as represented by the United States Department of Energy, Washington, D.C.

[21] Appl. No.: 448,546

[22] Filed: Apr. 15, 1965

[51] Int. Cl.² .............................................. C09K 3/00
[52] U.S. Cl. ............................. 252/301.1 R; 264/0.5; 176/89
[58] Field of Search ..................... 252/301.1; 264/0.5; 176/89; 23/349

[56] References Cited

U.S. PATENT DOCUMENTS

| | | | |
|---|---|---|---|
| 3,232,717 | 2/1966 | Hill et al. | 428/556 |
| 3,236,921 | 2/1966 | Sermon | 264/0.5 |
| 3,255,277 | 6/1966 | Smith | 264/0.5 |

Primary Examiner—Stephen J. Lechert, Jr.
Attorney, Agent, or Firm—R. V. Lupo; Luther A. Marsh

EXEMPLARY CLAIM

1. A high temperature graphite-uranium base nuclear fuel composition containing from about 1 to about 5 weight percent rhenium metal.

4 Claims, No Drawings

NUCLEAR FUEL COMPOSITION

The present invention relates to a new and improved nuclear fuel composition and to a method of producing same. More particularly, it relates to a new and improved nuclear fuel composition containing a small amount of rhenium metal and to a method of producing same. Still more particularly, it relates to a new and improved high temperature graphite uranium base nuclear fuel composition containing a small amount of rhenium metal and to a method of producing same.

A primary goal of the national space program is to achieve greater capability for successful accomplishment of future manned and unmanned space missions of the interplanetary type. Suitable nuclear engines for vehicle propulsion would supply much greater specific impulse than is now obtainable with chemical propulsion systems, thus permitting larger payloads and longer manned or unmanned space flight times. The most promising reactor or nuclear engine concept at the present time, involves the use of graphite and uranium in the reactor core. The graphite forms the structural matrix of the reactor core and also functions as a carrier and moderator for the enriched uranium fuel. The uranium is present as uranium dicarbide in a homogeneous dispersed phase. The reactor is essentially a heat engine and uses hydrogen gas as a work fluid. The heated hydrogen is expanded through a properly designed nozzle to produce mechanical thrust. This type reactor must operate at temperatures in excess of 4000° F. to obtain the required thermodynamic efficiency. Therefore, stringent requirements are imposed on the mechanical strength, thermal stability and corrosion resistance of the structural matrix of the nuclear fuel composition.

A further exacting requirement over and above the stringent requirements of mechanical strength, thermal stability and corrosion resistance of the structural matrix of the nuclear fuel composition is that of thorough and complete burnup of the nuclear fuel composition matrix upon re-entering the earth's atmosphere. The absolute destruction of the nuclear fuel composition matrix is necessary to prevent any harmful radioactivity to reach the general population. A primary destruct mechanism such as explosives or a nuclear excursion will serve to shatter the core into small pieces, which pieces will then be subjected to aerodynamics heating and oxidation during their fall to earth. One method of improving re-entry burnup is to cause an acceleration of the oxidation rate of the small particles or increased fracture breakup of these particles by means of an integral chemical additive to the fuel. And, this will also enhance the initial reactor destruct capability by adding a material which will render the core more susceptible to fracture into very small pieces.

It is accordingly an object of this invention to provide a highly efficient nuclear fuel composition.

Another object of this invention is to provide a highly efficient nuclear fuel composition containing an additive which allows elevated temperature mechanical strength of a graphite nuclear fuel composition for use as a nuclear reactor core.

Another object of this invention is to provide a highly efficient nuclear fuel composition containing a small amount of rhenium metal.

Another object of this invention is to provide a highly efficient nuclear fuel composition that will be rendered harmless before descent to earth.

Another object of this invention is to provide a highly efficient nuclear fuel composition that will be rendered harmless by oxidation in the earth's atmosphere before descent to earth.

Still another object of this invention is to provide a highly efficient nuclear fuel composition containing a small amount of rhenium metal that will be rendered harmless by oxidation in the earth's atmosphere before descent to earth.

Briefly stated, the process which satisfies the objects of the present invention comprises admixing a small amount of rhenium metal uniformly dispersed as a fine powder with a graphite uranium base nuclear fuel composition containing a liquid binder, extruding said mixture into a shaped article, curing said shaped article, baking said shaped article and then firing said shaped article.

To better describe the process of the invention, the following examples are set forth, with the understanding that they should be considered merely as illustrative of and not limitative upon the scope of the invention. The experimental procedure selected was to produce representative samples to furnish bases of comparison. Four distinct groups of material were prepared in the same manner and were tested for tensile and flexural strength, and oxidation tests in flowing air atmospheres to determine the effects of additives in accelerating the burnup rate of fueled and unfueled materials. The oxidation apparatus was designed to simulate high altitude, high velocity re-entry along a typical small particle trajectory. And sensitization treatment of representative materials was tested to determine effects of additives on degradation of properties resulting from transient heating to temperatures far above normal operating temperatures. Table 1, following the examples illustrates the success of the fabrication and processing treatments in producing material similar to previously known fuel element production wherein the tensile and flexural strength illustrated in fracture stress (psi) and the oxidation rate at elevated temperatures are the determining parameters.

EXAMPLE I (Contains Only The Basic Graphite Mixture Matrix)

A mixture comprising two pounds of dry graphite matrix ingredients, consisting of 85 w/o graphite flour and 15 w/o Thermax (trademark for a proprietary thermatomic or amorphous carbon) is weighed and then dried in a vacuum oven at 200° C. for one hour. After drying, the graphite mix is transferred to a Patterson-Kelley V-blender where further mixing is carried out for thirty minutes to ensure thorough and intimate blending. A liquid binder, consisting of varcum (a partially polymerized furfuryl alcohol) catalyzed with four grams of maleic anhydride per 100 cc of Varcum, is prepared immediately prior to addition to the dry graphite mixture. The maleic anhydride is crushed to −20 mesh powder and added to the Varcum. The liquid is stirred for ten minutes with an electric stirrer to facilitate solution of the powder. Addition of the binder to the dry graphite mixture is then followed by manual mixing. This is accomplished by placing the dry materials in a bowl, adding the catalyzed binder and kneading for approximately five minutes. Additional blending is accomplished by passing the material through a Hobart chopper prior to extrusion. Extrusion is carried out in a 75,000 pound vertical Loomis extrusion press. The press chamber diameter is 2⅜ inches, and the die has a nominal ⅜ inch diameter with a total included entrance angle of 120°. This corresponds to an area reduction ratio of approximately 40:1. Extrusion pressures are approximately 9000 pounds load on the 2⅜ inch ram. The chamber is evacuated by means of a mechanical pump after loading and prior to extrusion. Curing of the extruded shaped articles is accomplished by placing them on ½ inch thick transite trays and placing the trays in a Blue "m" circulating air oven. The oven temperature is maintained at 50° C. for twelve hours, the temperature is then raised from 50° C. to 250° C. with 10°–15° C. increments every thirty minutes. Upon reaching the temperature of 250° C., the oven is allowed to cool to room temperature. The shaped articles are then placed in a Vycor tube at room temperature, the tube is then placed in a Hevi-Duty muffle furnace having a flowing argon atmosphere. The muffle furnace is raised to 250° C. rapidly, the temperature is then raised from 250° C. to 850° C., with 50°–75° C. increments every thirty minutes up through 600° C., and 100° C. increments every hour from 600° C. to 850° C. The firing or graphitization takes place by removing the shaped articles from the muffle furnace after that furnace has been shut down and cooled to 300° C., and placing them in a graphite crucible and raising the temperature of the articles from ambient to 1900° C. in approximately two hours and held at this temperature for six hours. After this treatment, the crucible and its contents are allowed to cool twelve hours in the furnace in an argon atmosphere.

EXAMPLE III (Contains Graphite Mixture Matrix & $UC_2$ Plus Sensitization)

A mixture comprising two pounds of dry graphite matrix ingredients as in Example I is intimately mixed with the proper percentage of uranium carbide fuel particles to provide the proper uranium density in the final product. This mixture is then thoroughly blended with Varcom as in Example I. Subsequent mixing, blending, extruding, curing, baking and firing is carried out as in Example I. Special sensitization treatment is effected by placing the shaped article in a furnace and raising the temperature to 2750° C. in a flowing argon atmosphere in a 2–3 hour period. The furnace is then cut off and the articles removed when cool.

EXAMPLE IV (Contains Graphite Mixture Matrix, $UC_2$, Rhenium Plus Sensitization)

A mixture comprising two pounds of dry graphite matrix ingredients as in Example I is intimately mixed with less than 5 w/o rhenium metal comminuted to minus 200 mesh, and the proper percentage of uranium carbide fuel particles to provide the proper uranium density in the final product. This mixture is thoroughly blended with Varcom as in Example I. Subsequent processing of mixing, blending, extruding, curing, baking and firing is carried out as in Example I. Special sensitization treatment is effected by placing the shaped article in a furnace and raising the temperature to 2750° C. in a flowing gas atmosphere in a 2–3 hour period. The furnace is then cut off and the shaped articles removed when cool.

TABLE I

| COMPOSITION | TEST TEMP. (°F.) | THERMAL TREATMENT | FLEXURAL STRENGTH FRACTURE STRESS(psi) | TENSILE STRENGTH TEST FRACTURE STRESS(psi) | TEMP.(°C.) | % wt. loss (20 min. run) | OXIDATION RATE (Atoms/$cm^2$-min)×$10^{19}$ |
|---|---|---|---|---|---|---|---|
| 1. Reference (Unfueled material and no additives) | 2400 | Normal | 8910 | 2400    4580 | 1200° C. | 11.8 | 2.77 |
|  | 4000 | Normal | 11135 | 4000    8340 | 1200° C. (Sens.) | 11.8 | 2.77 |
|  |  |  |  |  | 1000° C. | 4.58 | 1.16 |
|  |  |  |  |  | 1400° C. | 22.5 | 5.72 |
| 2. Reference (matrix) and $UC_2$ Fuel | 2400 | Normal | 6560 | 2400    5160 | 1200° C. | 16.2 | 4.08 |
|  | 4000 | Normal | 8810 | 4000    6670 | 1200° C. (Sens.) | 15.2 | 4.15 |
|  | 4000 | Sensitized | 5720 | 4000    5265 |  |  |  |
| 3. Unfueled Material and 1% Rhenium | 2400 | Normal | 10180 | 2400    7080 | 1200° C. | 17.8 | 4.40 |
|  | 4000 | Normal | 12800 | 4000    9040 |  |  |  |
| 4. Fueled Material and 1% Rhenium | 2400 | Normal | 7280 | 2400    5560 | 1200° C. | 22.6 | 6.68 |
|  | 4000 | Normal | 12133 | 4000    7240 |  |  |  |

EXAMPLE II (Contains Basic Graphite Matrix Mixture Plus Rhenium)

A mixture comprising two pounds of dry graphite matrix ingredients as in Example I is thoroughly and intimately mixed with less than 5 w/o rhenium metal comminuted to minus 200 mesh. This mixture is then thoroughly blended with Varcom as in Example I. Subsequent mixing, blending, extruding, curing, baking, and firing is carried out as in Example I.

As illustrated in the examples and Table I, only small quantities of an additive is required or needed to cause significant strengthening when present in the graphite matrix as a uniformly dispersed fine powder. However, amounts up to five weight percent can be used without any detrimental effect. Further, the oxidation or burnup rate increased materially with the addition of rhenium in an amount of about one to about five weight percent.

The uses of this invention are many. The current evaluated uses include the strengthening of reactor or nuclear engines. A further an evaluated use includes the accelerated burnup rate of such a reactor or nuclear engine when it is necessary to return it to earth from interplanetary space.

The advantages of this invention are also many. With this invention, we can now proceed to the solving of other problems inasmuch as the strengthening of the matrix by the use of a proper additive yields a reactor or nuclear engine that can withstand the high temperatures required to obtain the therodynamic efficiency in interplanetary space vehicles, as well as preventing radioactive contamination to be unleashed on the general population in the event of failure of the craft or its purposeful return to earth.

Many equivalent modifications of the above will be apparent to those skilled in the art without a departure from the inventive concept. It is to be understood that changes may be made in the particular embodiments of the invention described which are within the full intended scope of the invention as defined by the appended claims.

What is claimed is:

1. A high temperature graphite-uranium base nuclear fuel composition containing from about 1 to about 5 weight percent rhenium metal.

2. A high temperature graphite-uranium base nuclear fuel composition containing about 1 weight percent rhenium metal.

3. A high temperature graphite-uranium base nuclear fuel composition containing from about 1 to about 5 weight percent rhenium metal in a finely divided powder form.

4. A high temperature graphite-uranium base nuclear fuel composition containing about 1 weight percent rhenium metal in a finely divided powder form.

* * * * *